United States Patent
Beaulieu et al.

(10) Patent No.: US 10,837,087 B2
(45) Date of Patent: Nov. 17, 2020

(54) COPPER INFILTRATED MOLYBDENUM AND/OR TUNGSTEN BASE POWDER METAL ALLOY FOR SUPERIOR THERMAL CONDUCTIVITY

(71) Applicant: FEDERAL-MOGUL LLC, Southfield, MI (US)

(72) Inventors: Philippe Beaulieu, Coventry (GB); Denis B. Christopherson, Jr., Waupun, WI (US)

(73) Assignee: Tenneco Inc., Lake Forest, IL (US)

( * ) Notice: Subject to any disclaimer, the term of this patent is extended or adjusted under 35 U.S.C. 154(b) by 315 days.

(21) Appl. No.: 15/668,368

(22) Filed: Aug. 3, 2017

(65) Prior Publication Data
US 2018/0087135 A1 Mar. 29, 2018

Related U.S. Application Data

(60) Provisional application No. 62/400,867, filed on Sep. 28, 2016.

(51) Int. Cl.
*C22C 27/04* (2006.01)
*B22F 3/16* (2006.01)
(Continued)

(52) U.S. Cl.
CPC ............ *C22C 27/04* (2013.01); *B22F 1/0003* (2013.01); *B22F 3/16* (2013.01); *C22C 1/1036* (2013.01);
(Continued)

(58) Field of Classification Search
None
See application file for complete search history.

(56) References Cited

U.S. PATENT DOCUMENTS 1,633,258 A 6/1927 Laise
2,131,994 A 10/1938 Hensel
(Continued)

FOREIGN PATENT DOCUMENTS

CN 1784502 A 6/2006
CN 1947896 A 4/2007
(Continued)

OTHER PUBLICATIONS

MakeitFrom.Com, Tungsten Carbide, (https://www.makeitfrom.com/material-properties/Tungsten-Carbide-WC) accessed Oct. 12, 2019. (Year: 2018).*
(Continued)

*Primary Examiner* — David Sample
*Assistant Examiner* — Elizabeth Collister
(74) *Attorney, Agent, or Firm* — Robert L. Steams; Dickinson Wright, PLLC

(57) ABSTRACT

A sintered material for use in an internal combustion engine, such as a valve seat insert, is provided. The material includes a pressed base powder metal mixture and a Cu-rich phase infiltrated in pores of the base powder metal mixture. The base powder metal mixture includes at least one of Mo and W, and at least one additive, such as B, N, and/or C. The amount of the Mo and/or W is 50 wt. % to 85 wt. %, based on the total weight of the material. The at least one additive is present in a total amount of 0.2 to 25 wt. %, based on the total weight of the material, and the Cu-rich phase is present in an amount of 15 wt. % to 50 wt. %, based on the total weight of the material. The material also has a thermal conductivity of at least 70 W/mK.

16 Claims, 10 Drawing Sheets

(51) Int. Cl.
*F01L 3/02* (2006.01)
*F16K 1/42* (2006.01)
*B22F 1/00* (2006.01)
*C22C 1/10* (2006.01)
*C22C 29/00* (2006.01)
*C22C 32/00* (2006.01)
*C22C 19/07* (2006.01)
*C22C 29/14* (2006.01)
*C22C 29/02* (2006.01)
*C22C 38/18* (2006.01)
*C22C 29/16* (2006.01)
*F16K 25/00* (2006.01)
*C22C 29/08* (2006.01)

(52) U.S. Cl.
CPC ............ *C22C 1/1068* (2013.01); *C22C 19/07* (2013.01); *C22C 29/005* (2013.01); *C22C 29/02* (2013.01); *C22C 29/14* (2013.01); *C22C 29/16* (2013.01); *C22C 32/0047* (2013.01); *C22C 32/0052* (2013.01); *C22C 32/0068* (2013.01); *C22C 32/0073* (2013.01); *C22C 38/18* (2013.01); *F01L 3/02* (2013.01); *F16K 1/42* (2013.01); *F16K 25/005* (2013.01); *B22F 2301/00* (2013.01); *B22F 2998/10* (2013.01); *C22C 29/08* (2013.01)

(56) References Cited

U.S. PATENT DOCUMENTS

| | | | |
|---|---|---|---|
| 3,790,352 A * | 2/1974 | Niimi | C22C 33/02 428/568 |
| 5,895,517 A | 4/1999 | Kawamura et al. | |
| 6,066,191 A | 5/2000 | Tanaka et al. | |
| 6,271,585 B1 | 8/2001 | Osada et al. | |
| 6,917,638 B2 | 7/2005 | Suzuki et al. | |
| 6,927,421 B2 | 8/2005 | Ishikawa et al. | |
| 6,933,531 B1 | 8/2005 | Ishikawa et al. | |
| 7,083,759 B2 | 8/2006 | Osada et al. | |
| 2003/0096059 A1 | 5/2003 | Suzuki et al. | |
| 2004/0131492 A1 * | 7/2004 | Kawakami | C22C 19/07 419/60 |
| 2005/0132842 A1 | 6/2005 | Kawata et al. | |
| 2006/0246314 A1 | 11/2006 | Osada et al. | |
| 2007/0081914 A1 | 4/2007 | Yoshihiro et al. | |
| 2008/0298024 A1 | 12/2008 | Takashima et al. | |
| 2015/0322828 A1 * | 11/2015 | Kohler | F01L 3/02 277/502 |
| 2016/0003563 A1 | 1/2016 | Dutta | |

FOREIGN PATENT DOCUMENTS

| | | |
|---|---|---|
| CN | 102172775 A | 9/2011 |
| EP | 0882806 A1 | 12/1998 |
| EP | 1536028 A2 | 6/2005 |
| JP | 2011105979 A | 6/2011 |

OTHER PUBLICATIONS

Tibtech.com, Metals Properties, (https://www.tibtech.com/conductivite.php?lang=en_US) accessed Oct. 12, 2019. (Year: 2019).*

NDT, Hardness Conversion Chart, (https://www.nde-ed.org/GeneralResources/HardnessConv/HardnessConvPrint.pdf) accessed Oct. 12, 2019. (Year: 2019).*

International Search Report, dated Nov. 20, 2017 (PCT/US2017/045418).

* cited by examiner

| (w%) | Alloy A | Alloy B | Alloy C |
|---|---|---|---|
| C | 0.7-1.1 | 0.5-1.5 | 0.5-1.5 |
| S | 0.05-0.3 | 0.1-0.3 | - |
| V | 2-3 | 1-3 | - |
| Cr | 2.5-4 | 2-6 | - |
| Mn | 0.3-0.9 | 0.3-0.9 | - |
| Co | - | 16-22 | - |
| Cu | 15-25 | 15-25 | 25-45 |
| Mo | 4-6 | 7-14 | Base |
| W | 3.9-5.5 | 3-6 | - |
| Fe | Base | Base | - |
| Typical thermal conductivity (W/mK; 20°C) | 40 | 35 | 150 |

Wear against an alumina counterpart

| | Co | Cr | Mo | C | Si | Ni | Fe | S | V | Cu | W | Mn | Be | N |
|---|---|---|---|---|---|---|---|---|---|---|---|---|---|---|
| T400 | Bal. | 8.5 | 28.5 | <0.1 | 2.6 | <1.5 | <1.5 | - | - | - | - | - | - | - |
| FM-3010 | - | 2.5-4 | 4-6 | 0.7-1.1 | - | - | Bal. | 0.05-0.3 | 2-3 | 15-25 | 3.9-5.5 | - | - | - |
| Mix 5 | - | - | Bal. | <0.1 | - | - | - | - | - | 27-47 | - | - | - | 0.2-1 |
| Mix 5A | - | - | Bal. | 1-2 | 2-5 | - | - | - | - | 27-47 | - | - | - | 0.2-1 |
| Mix 5B | - | - | Bal. | 0.5-1.5 | - | - | - | - | - | 27-47 | - | - | - | 0.2-1 |
| Mix 6 | - | 5-10 | Bal. | <0.1 | - | - | - | - | - | 27-47 | - | - | - | 0.2-1 |
| Moldstar 90 | - | 0.6-1.2 | - | - | 1.5-2.5 | 6.4-7.6 | - | - | - | Bal. | - | - | - | 1-3 |
| C17200 | - | - | - | - | - | 1 | 1 | - | - | Bal. | - | - | 1.8-2.0 | - |
| Stellite 6 | Bal. | 30 | - | 2.5 | 1.2 | - | 1 | - | - | - | 12 | - | - | - |
| Aisi 52100 | - | 1.45 | - | 1.04 | 0.25 | - | Bal. | - | - | - | - | 0.35 | - | - |

FIG. 10 ies, and methods of forming powder metal materials, for example powder metal materials for valve guides and valve seat inserts.

COPPER INFILTRATED MOLYBDENUM AND/OR TUNGSTEN BASE POWDER METAL ALLOY FOR SUPERIOR THERMAL CONDUCTIVITY

CROSS-REFERENCE TO RELATED APPLICATION

This U.S. utility patent application claims priority to U.S. provisional patent application No. 62/400,867, filed Sep. 28, 2016, the contents of which is incorporated herein by reference in its entirety.

BACKGROUND OF THE INVENTION

1. Field of the Invention

This invention relates generally to powder metal materials, and methods of forming powder metal materials, for example powder metal materials for valve guides and valve seat inserts.

2. Related Art

Powder metal materials are oftentimes used to form parts with improved wear resistance and/or thermal conductivity for automotive vehicle applications, such as valve guides and valve seat inserts. A typical exhaust valve seat insert can reach a temperature between 400° C. and 500° C. during engine operation. Due to the demanding environment of the engine, the materials used to form valve guides and valve seat inserts preferably have a combination of high hot hardness and lubricity. Recently, it has been more desirable to also provide valve seats inserts and guides having a high thermal conductivity. The materials should also provide sufficient wear resistance from a low temperature, such as at the start of the engine, to a high temperature, such as when the engine is operating at high performance and running at full rated powder. There remains a need for materials with exceptional hardness, thermal conductivity, and wear resistance at high and low temperatures, such as powder metal-based materials for use in demanding internal combustion engine applications, especially valve seat inserts.

SUMMARY

One aspect of the invention provides a valve seat insert, comprising a material including a base powder metal mixture and a Cu-rich phase. The base powder metal mixture includes at least one of Mo and W. The base powder metal mixture also includes a plurality of pores, and the Cu-rich phase is disposed in the pores of the base powder metal mixture.

Another aspect of the invention provides a material for use in an internal combustion engine comprising a base powder metal mixture and a Cu-rich phase. The base powder metal mixture includes at least one of Mo and W. The base powder metal mixture also includes at least one additive, and the at least one additive includes at least one of B, N, and C. The base powder metal mixture includes a plurality of pores; and the Cu-rich phase disposed in the pores of the base powder metal mixture.

Another aspect of the invention provides a method of manufacturing a valve seat insert. The method includes pressing a base powder metal mixture, the base powder metal mixture including at least one of Mo and W; infiltrating the base powder metal mixture with a Cu-rich phase; and sintering the infiltrated base powder metal mixture.

Yet another aspect of the invention provides a method of manufacturing a material for use in an internal combustion engine. The method comprises the steps of infiltrating a base powder metal mixture with a Cu-rich phase, the base powder metal mixture including at least one of Mo and W; and sintering the infiltrated base powder metal mixture.

The material can provide exceptional hardness, thermal conductivity, and wear resistance, at both high and low temperatures. The material is thus preferably for use in valve guides and valve seat inserts of internal combustion engines. More specifically, the material provides a good balance of wear resistance and thermal conductivity from a low temperature, such as about 0° C. to 100° C. at the start of the engine, to high temperature, such as 300° C. to 500° C. when the engine is operating at high performance and running at full rated powder.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 10 is a table listing nominal compositions of powder metal materials tested.

DETAILED DESCRIPTION OF EXAMPLE EMBODIMENTS

Figure 1:
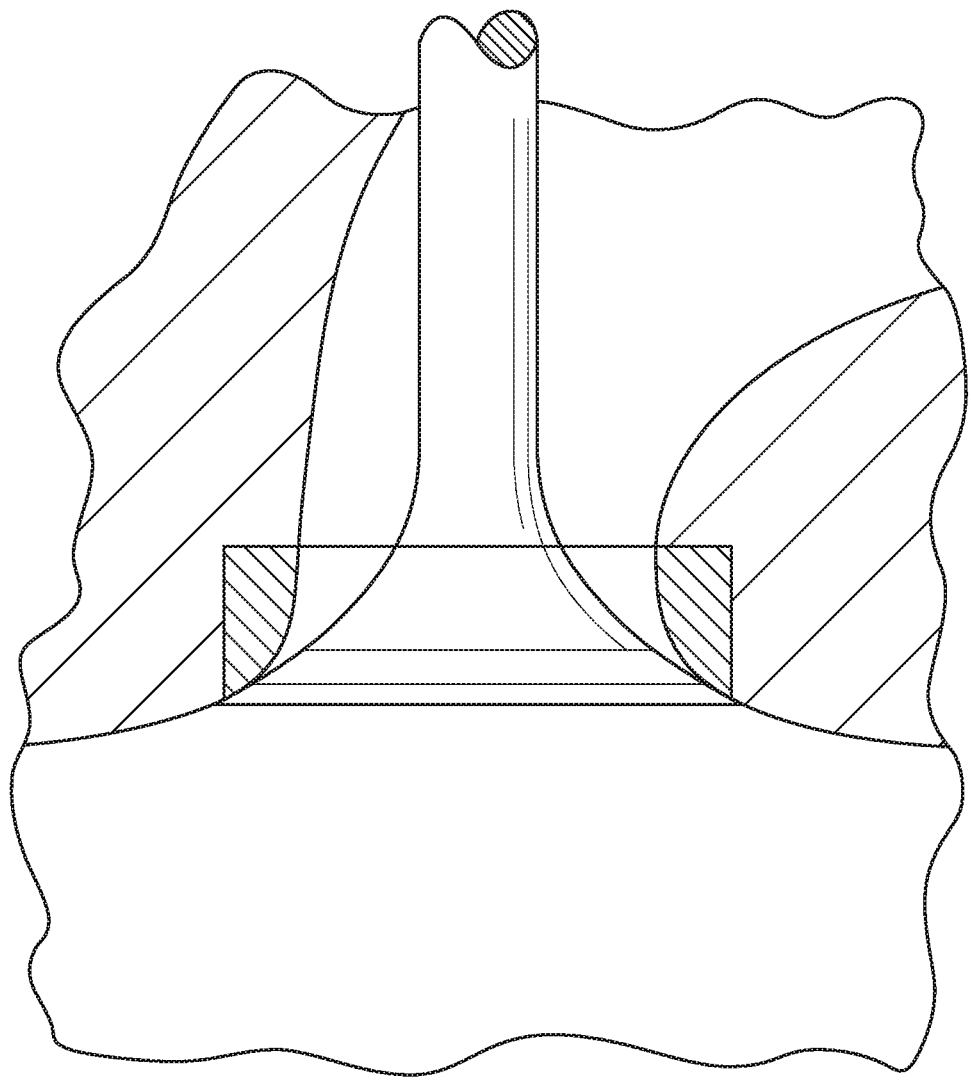
FIG. 1 is an example of a portion of an internal combustion engine including valve seat inserts formed of the material according to one embodiment of the invention.

One aspect of the invention provides a material formed of a base powder metal mixture and an infiltrated copper phase or network which has an exceptional balance of thermal conductivity and wear resistance at a range of temperatures encountered in an internal combustion engine. The material is preferably used in valve seat insert applications, for example to form a valve seat insert as shown in FIG. 1. The material can also be used to form a valve guide, or another component subjected to the harsh conditions of an internal combustion engine.

The base powder metal mixture includes at least one of molybdenum (Mo) and tungsten (W). In one embodiment, the base powder metal mixture includes both Mo and W. The Mo and/or W are typically present in an amount of 75.0 wt. % to 99.8 wt. %, based on the total weight of the base powder metal mixture.

The base powder metal mixture also includes at least one additive or compound, also referred to as an additional element, hard particle, hard phase, or tribological constituent. The at least one additive is selected to improve the wear resistance of the base powder metal mixture while also achieving a relatively high thermal conductivity in the finished material. The amount of additives used in the base powder metal mixture does not hinder the formation of Mo and/or W lubricious oxides formed on the material at high temperatures, such as in the application while the engine is running. For example, the oxides formed can include $MoO_3$ which is a compound that has a very low coefficient of friction and thus contributes to the improved wear resistance. The wear resistance is a function of temperature and is a combination of factors. For example, the at least one additive can be selected to improve the wear resistance at a low temperature, while the lubricious oxide improves the wear performance at a higher temperature. The amount of additives can also be adjusted so that the thermal conductivity is at least 70 W/mK for the final material and the copper phase, preferably at least 90 W/mK for the final material and the copper phase, and more preferably at least 100 W/mK for the final material and 110 W/mK for the copper phase. The additives can also be selected so that the hardness of the finished material is above 55 HRA from room temperature up to 500° C.

According to one embodiment, the at least one additive includes at least one of boron (B), nitrogen (N), and carbon (C); and optionally at least one of silver (Ag), cobalt (Co), chromium (Cr), iron (Fe), manganese (Mn), niobium (Nb), nickel (Ni), phosphorus (P), sulfur (S), tantalum (Ta), titanium (Ti), vanadium (V), and zirconium (Zr). In the base powder metal mixture, the total sum of all of the additives is from 0.2 to 25 wt. %, and the total sum of any B, N, and C is from 0.2 to 5.0 wt. %, based on the total weight of the base powder metal mixture. The solubility in solid solution of the at least one of B, N, and C is preferably low in the Cu, W, and/or Mo, for example smaller than 0.1 wt. %, based on the total weight of the base powder metal mixture. According to one preferred embodiment, graphite is the additive selected to improve the wear resistance significantly at 300° C. and 450° C. when used in a base powder metal material including Mo. Example compositions that can be used to form the base metal mixture include Mo, V, and N; Mo and C; W and C; Mo, W, and B; Mo and MoC; and Mo, V, and N.

The base powder metal mixture is pressed to a desired shape according to a typical process. In the example embodiment, the base powder metal mixture is pressed to the shape of a valve seat insert. After pressing the base powder metal mixture, the base powder metal mixture includes a plurality of pores. In the example embodiment, the base powder metal mixture has a sponge morphology. However, the base powder metal mixture is not limited to the sponge morphology. Other structures are possible. Typically, the base powder metal mixture has a porosity of 10 volume percent (vol. %) to 50 vol. %, based on the total volume of the base powder metal mixture.

The pores of the skeleton of the base powder metal mixture are filled with the copper phase, typically by an infiltration process during sintering. The copper phase can be pure copper, a copper alloy, or a copper-based material. The copper phase should have a thermal conductivity which is at least 70 W/mK at 21° C. (room temperature), more preferably at least 90 W/mK, and most preferably at least 110 W/mK. For example, if the copper phase is pure copper, then the copper phase has a thermal conductivity of about 390 W/mK at room temperature. The copper phase typically fills the volume of the pores.

The finished material is a sintered material including the copper phase infiltrated in the pores of the pressed base powder metal mixture. As discussed above, the base powder metal mixture includes the Mo and/or W, and the amount of the Mo and/or W is typically present in an amount of 50 wt. % to 85 wt. %, based on the total weight of the finished material.

The base powder metal mixture of the finished material also includes the at least one additive or compound to improve the wear resistance while also maintaining a relatively high thermal conductivity. As discussed above, the at least one additive typically includes at least one of boron (B), nitrogen (N), and carbon (C); and optionally at least one of silver (Ag), cobalt (Co), chromium (Cr), iron (Fe), manganese (Mn), niobium (Nb), nickel (Ni), phosphorus (P), sulfur (S), tantalum (Ta), titanium (Ti), vanadium (V), and zirconium (Zr). The at least one additive is present in an amount of at least 0.2 wt. % and not greater than 25.0 wt. %, based on the total weight of the material. In addition, the total sum of any B, N, and C should be from 0.2 wt. % to 5.0 wt. %, based on the total weight of the material.

The finished material also includes the copper phase disposed in the pores of the base powder metal mixture. Typically, the copper phase is present in an amount of 15 wt. % to 50 wt. %, based on the total weight of the material.

The finished material provides an excellent combination of wear resistance and thermal conductivity. The wear resistance is improved by the formation of the lubricious oxides present in or on the material during high temperature operation, such as $MoO_3$ and/or $WO_3$. For example, the coefficient of friction of the material is typically 0.2 to 0.5, and may be up to 0.8. The finished material typically also has a thermal conductivity of at least 70 W/mK, preferably at least 90 W/mK, and more preferably at least 100 W/mK.

The hardness of the material is typically above 55 HRA from room temperature up to 500° C. Due to the favorable properties, the material performs well when used to form components for internal combustion engines, such as a valve seat insert.

As discussed above, the presence of Mo and/or W forms the lubricious oxide, $MoO_3$ and/or $WO_3$, in or one the material in the particular conditions of combustion engines, which include high temperatures and the presence of elemental oxygen or oxygen compounds. The formation of the lubricious oxide increases with temperature. However, above 400° C., these oxides do not form a stable oxide layer and the material can generate excessive oxidation. The lubricious oxides improve the coefficient of friction of the material.

A typical exhaust valve seat insert can reach a temperature between 400° C. and 500° C. However, the typical thermal conductivity of copper infiltrated high alloyed steel/tool steel used in exhaust applications is only around 30 W/mK to 50 W/mK. The high thermal conductivity of the material according to the invention is typically at least 70 W/mK and thus can help decrease the temperature of the valve seat insert to close to 400° C. or below, while also maintaining acceptable wear resistance. At this moderate temperature, the lubricious oxide can be generated without causing excessive oxide generation.

In addition, the formation of the lubricious oxide can significantly help to reduce wear at moderate to high temperatures encountered in the internal combustion engine. However, the material needs to be able to support the high impact caused by the valve. The presence of the light elements (B, C, and N) in combination with the additives is used to improve hardness, including hot hardness, and therefore wear resistance at low to moderate temperatures. The relatively high hardness from room temperature up to 500° C. is achieved by the formation of hard precipitates, such as MoC, $W_2C$, MoB, or solid solution strengtheners such as Ni in Cu. Also, the N present in the composition forms nitrides or carbonitrides.

As discussed above, the material can be made using a traditional powder metal process. The copper infiltration of the Mo and/or W matrices also allows high volume manufacturability using traditional powder metal technologies. However, the unique combination of hot hardness, lubricious oxide, and thermal conductivity is unique for materials used in applications as demanding as valve seat inserts, where the wear resistance needs to be good from a low temperature (engine starting) up to a high temperature (high performance engine running at full rated power). At low temperatures, hardness helps wear resistance. As the temperature increases, the hot hardness slightly decreases, but the generated lubricious oxide becomes the predominant mechanism to improve the wear resistance. The high thermal conductivity helps to limit the temperature of the valve seat insert so that it does not reach a high temperature where the generation of the oxide becomes too extensive.

Figure 2:
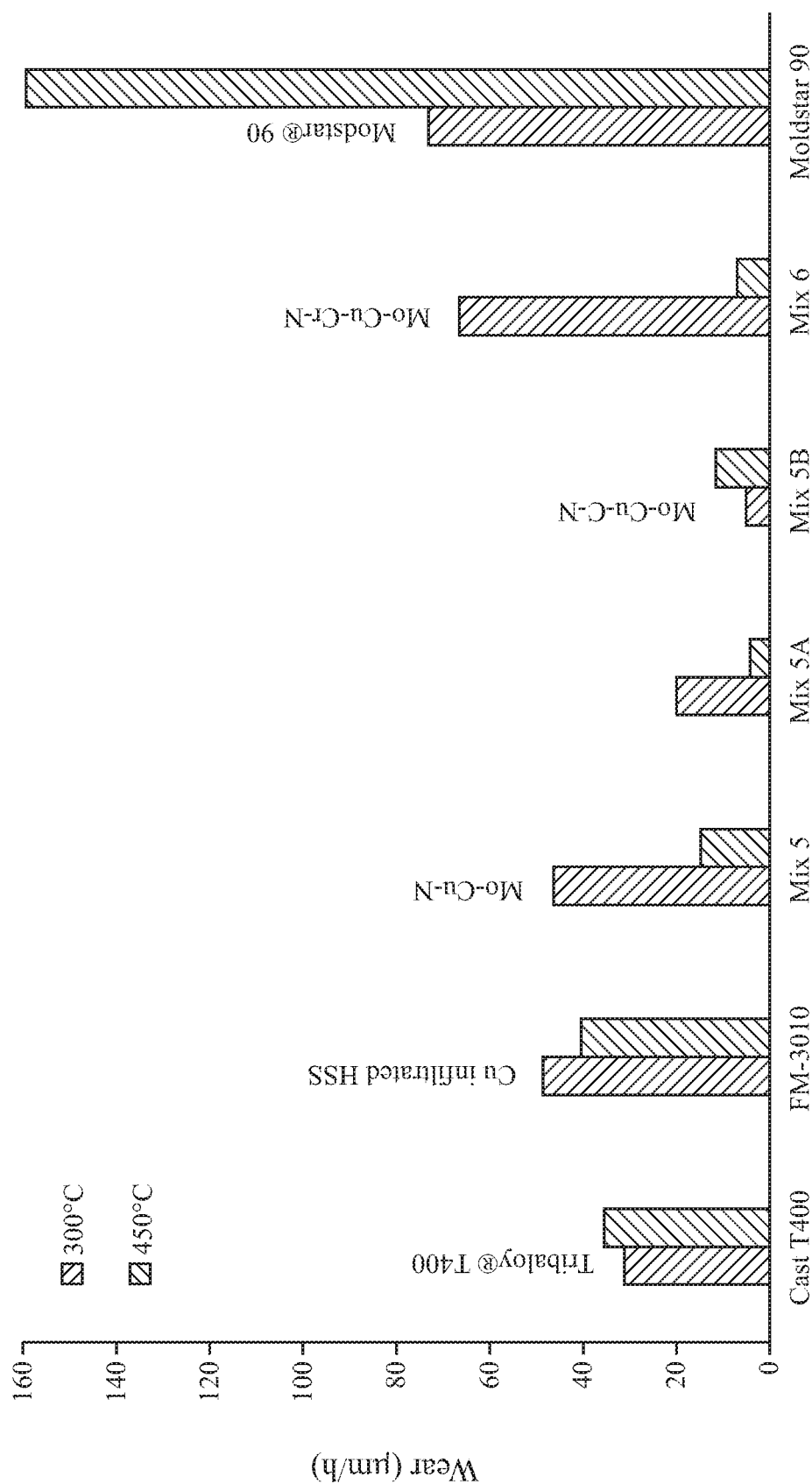
FIG. 2 is a graph illustrating wear resistance of example materials according to embodiments of the invention relative to comparative materials.

FIG. 2 is a graph illustrating the wear resistance of example materials according to embodiments of the invention relative to comparative powder metal materials. More specifically, the graph includes the wear of each material, measured in micrometers per hour, at 300° C. and 450° C. The Tribaloy T400 and FM-3010 are two comparative example materials that can be used for heavy duty valve seat insert applications. The MoCu materials, which are examples of inventive embodiments, show their exceptional wear resistance that was not expected. The nominal compositions of the powder metal materials are provided in FIG. 10. Also, all of the wear testing discussed in the present disclosure, besides the dynamometer test of FIG. 9, were done with the same test procedure. The test procedure is a sliding ball test using an applied force of 40 N, a nominal sliding speed of 50 mm/s, and a total sliding distance of 720 m.

Figure 3:
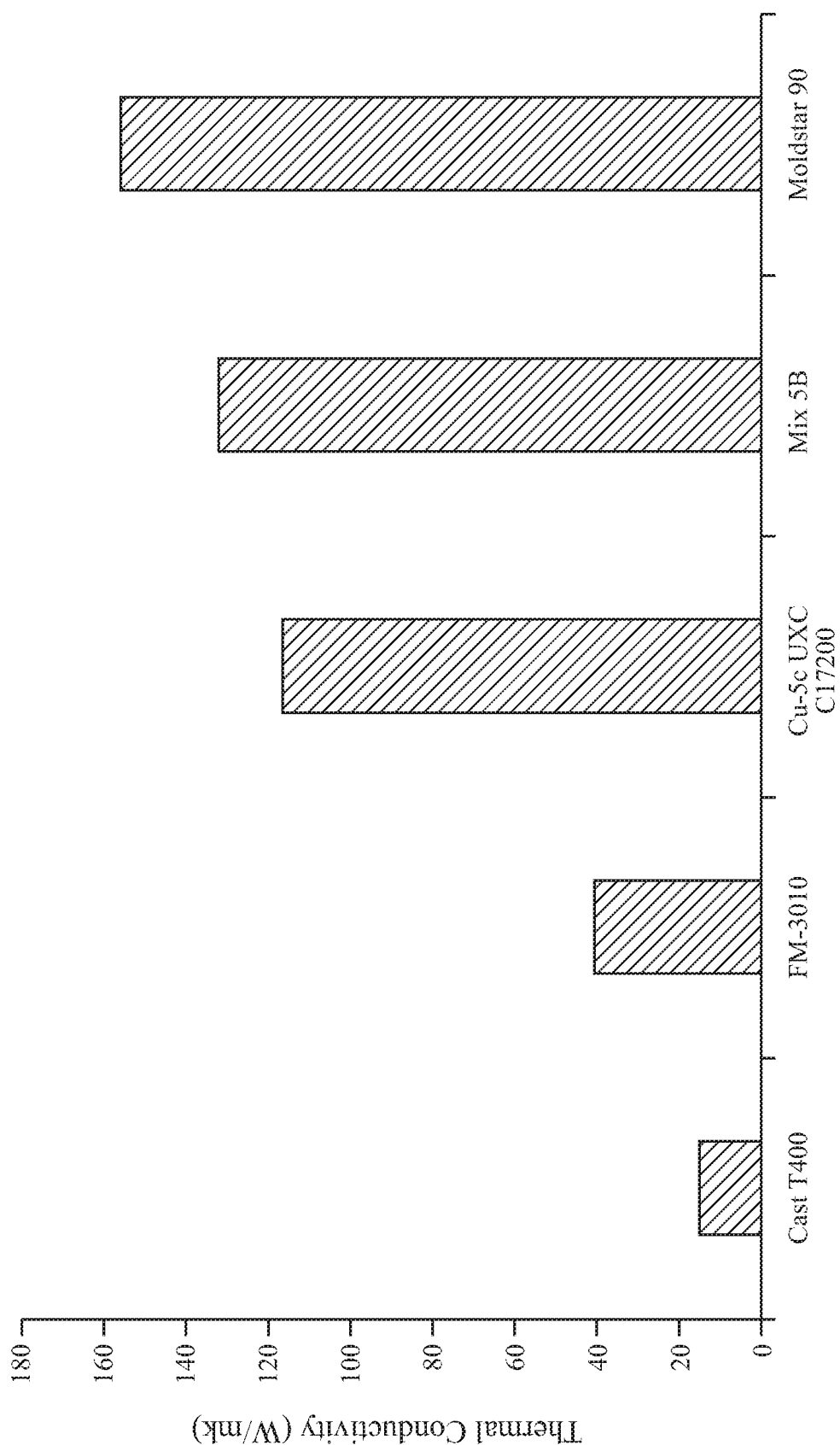
FIG. 3 is a graph illustrating thermal conductivity of materials according to embodiments of the invention relative to comparative materials.

FIG. 3 is a graph illustrating thermal conductivity of materials according to embodiments of the invention relative to comparative materials. The nominal compositions of the powder metal materials are provided in FIG. 10. The thermal conductivity of the inventive example material is close to the high thermal conductivity Cu alloys for VSI applications.

Figure 4:
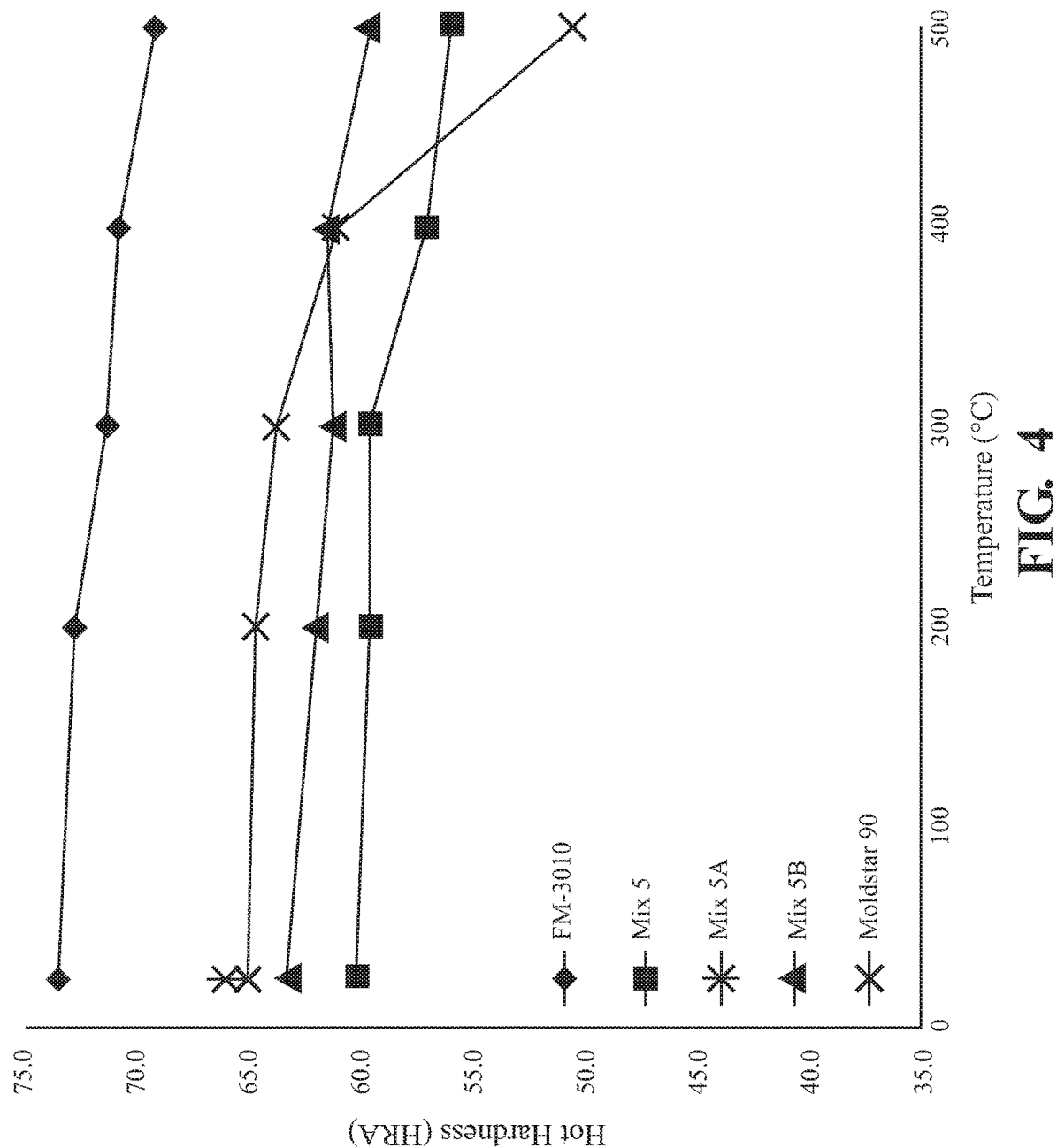
FIG. 4 is a chart illustrating hot hardness of materials according to embodiments of the invention relative to comparative materials.

FIG. 4 is a chart illustrating hot hardness (HRA) at various temperatures of materials according to embodiments of the invention relative to comparative materials. The nominal compositions of the powder metal materials are provided in FIG. 10. Apparent hardness testing is carried out with reference to ISO4498, MPIF 43 & ASTM E18.

Figure 5:
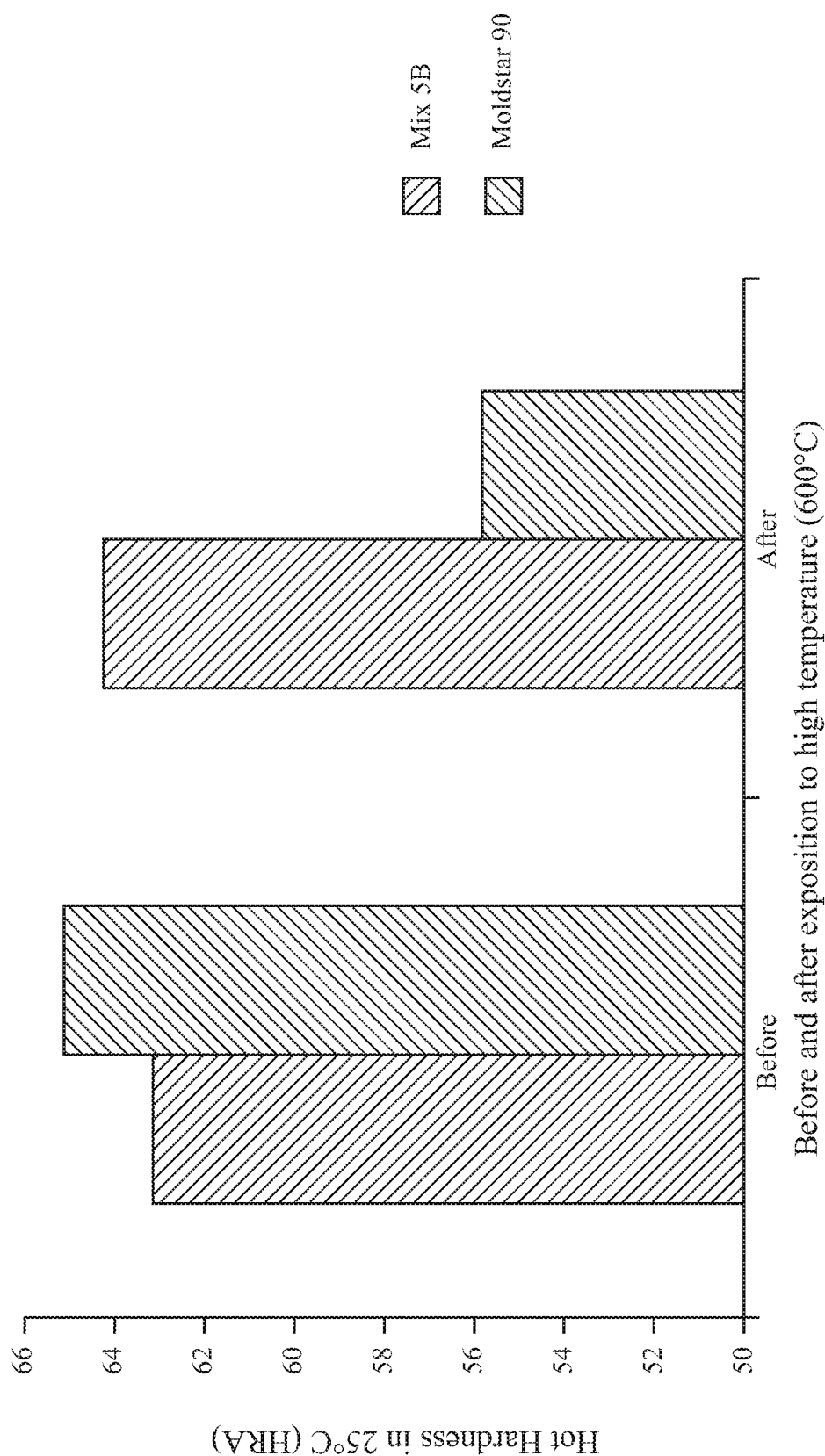
FIG. 5 is a graph illustrating hot hardness of materials according to embodiments of the invention relative to comparative materials.

FIG. 5 is a graph illustrating hot hardness at 25° C. (HRA) before and after exposure to 600° C. of a material according to an embodiment of the invention relative to a comparative material. The nominal compositions of the powder metal materials are provided in FIG. 10. Apparent hardness testing is carried out with reference to ISO4498, MPIF 43 & ASTM E18. The samples tested were exposed at 600° C. in air for 25-30 minutes. The nominal heating rate was about 3.5° C./min and the nominal cooling rate was about 9.5° C./min. FIG. 5 illustrates that the inventive material of the example embodiment does not show softening when exposed to high temperature compared to high thermal conductivity Cu-based materials.

Figure 6:
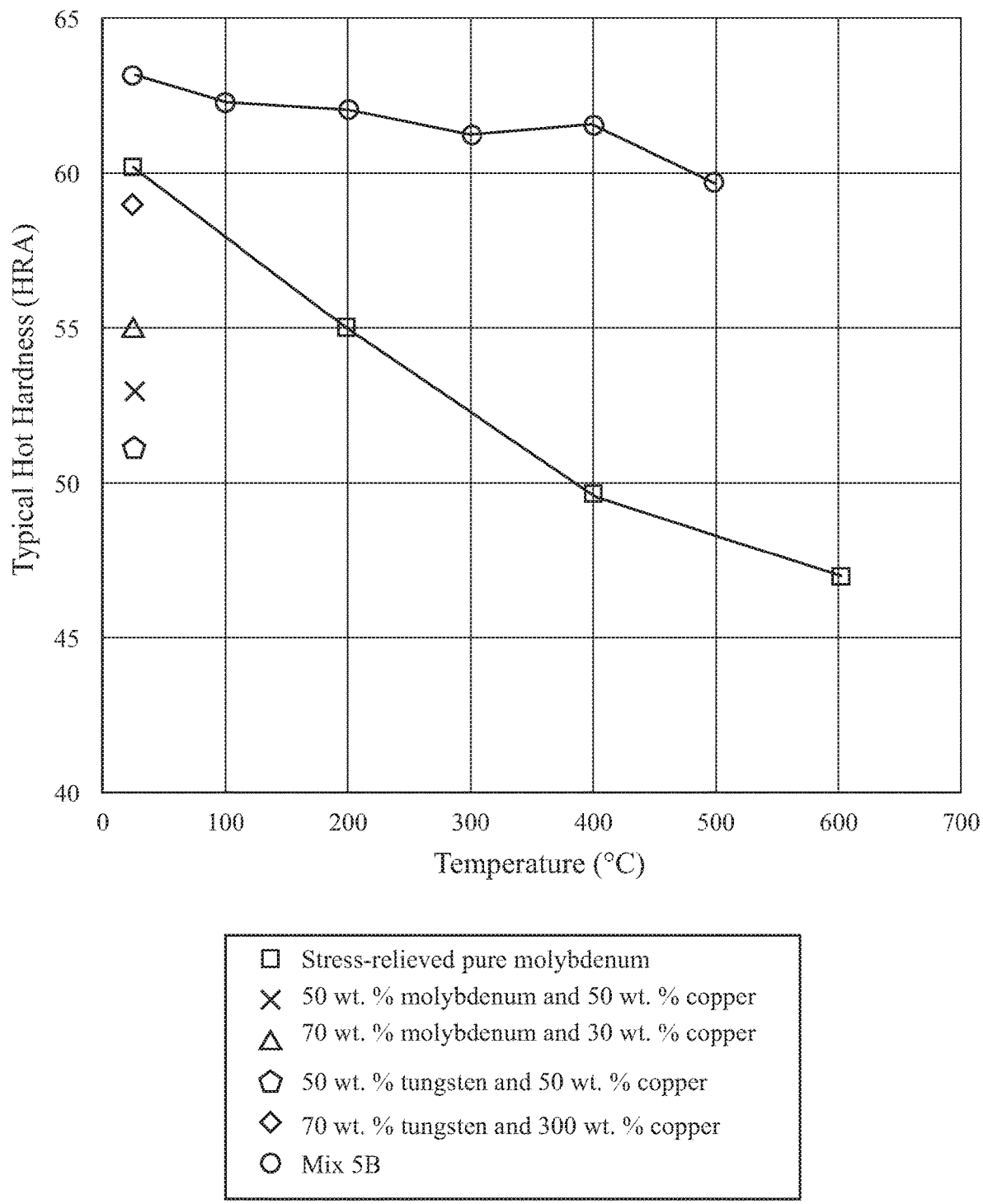
FIG. 6 is a chart illustrating hardness (HV10) of materials according to an embodiment of the invention relative to comparative materials.

FIG. 6 is a chart illustrating hardness (HV10) at various temperatures of materials according to embodiments of the invention relative to comparative materials. The first curve is stress-relieved pure molybdenum. The second, third, fourth, and fifth points are MoCu type materials used for thermal management in electronics. The material of the second point is 50 wt. % molybdenum and 50 wt. % copper. The material of the third point is 70 wt. % molybdenum and 30 wt. % copper. The material of the fourth dot is 50 wt. % tungsten and 50 wt. % copper. The material of the fifth dot is 70 wt. % tungsten and 30 wt. % copper. The sixth curve is an example material according to an embodiment of the invention which can be used in valve seat applications, referred to as Mix 5B.

Figure 7:
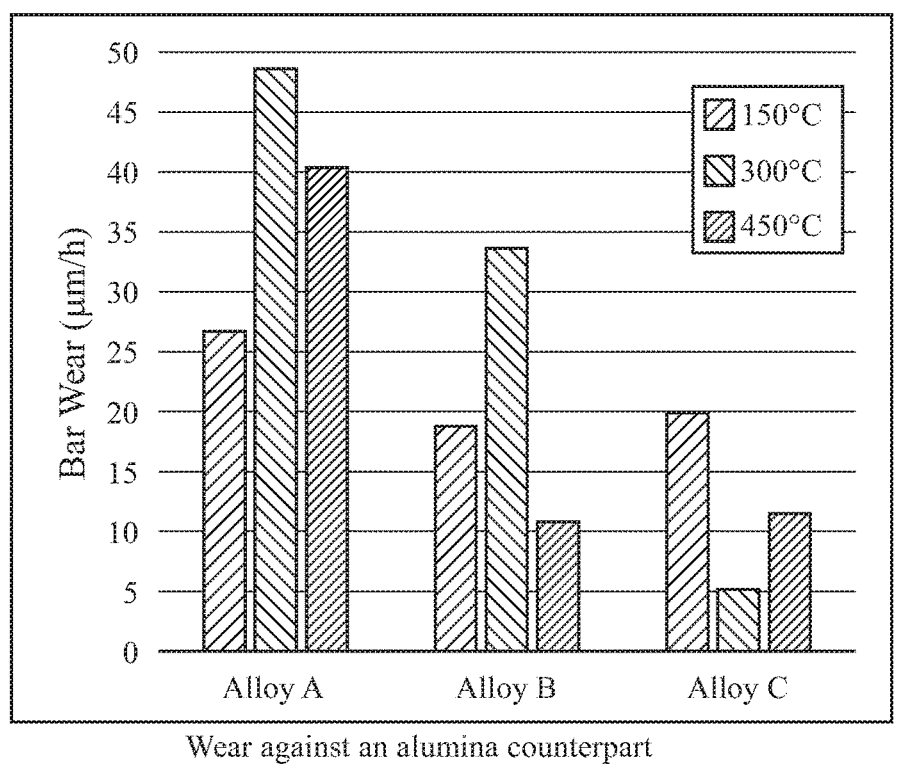
FIG. 7 includes a table and graph illustrating wear test results of two comparative materials (Alloys A and B) compared to the material according to an example embodiment of the invention (Alloy C) against an alumina counterpart.

FIG. 7 illustrates wear test results of two comparative materials (Alloys A and B) compared to the material according to an example embodiment of the invention (Alloy C) against an alumina counterpart. Alloys A and B are typical highly alloyed Cu infiltrated valve seat insert steels. Due to the lubricious nature of Alloy C, the wear resistance is significantly improved at 300° C. Due to the relatively low thermal conductivity of Alloys A and B, a temperature of 400-500° C. can be reached in an application. It is expected that Alloy C will be significantly cooler when used in an engine due to its high thermal conductivity. Alloy C also performs very well at high temperature, such as 450° C.

Figure 8B:
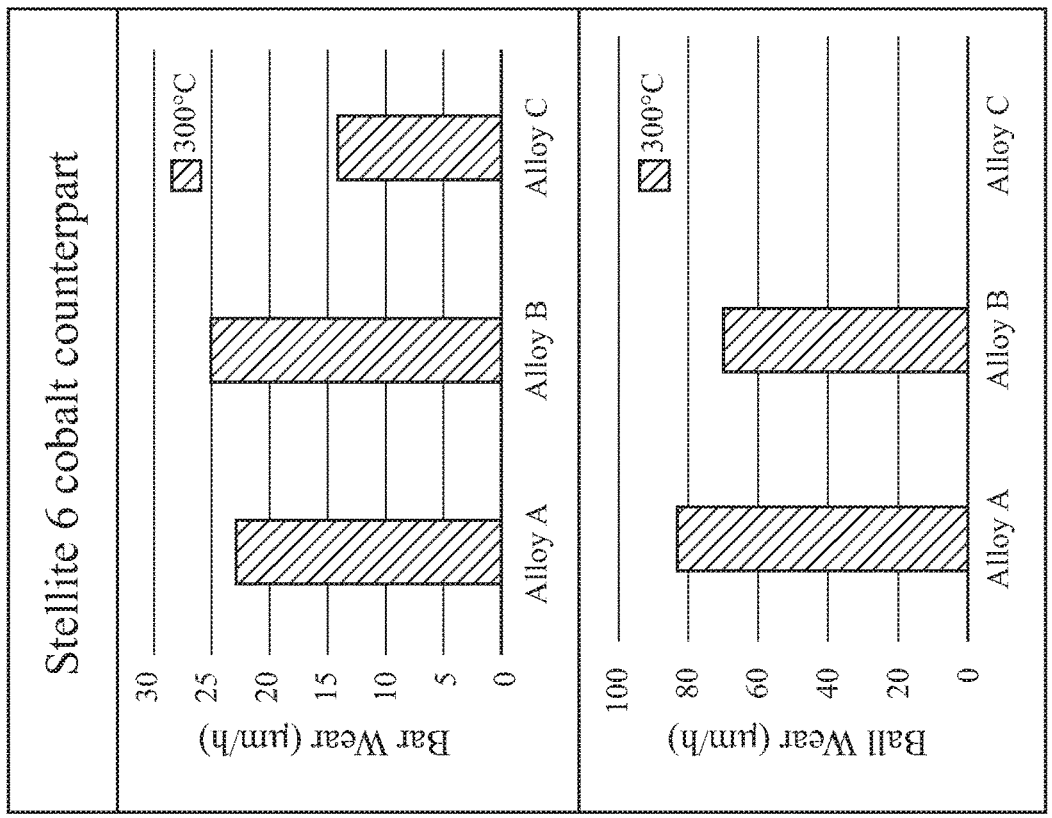
FIGS. 8A and 8B include four graphs illustrating wear test results of Alloys A and B compared to Alloy C and against a Stellite 6 counterpart.
Figure 8A:
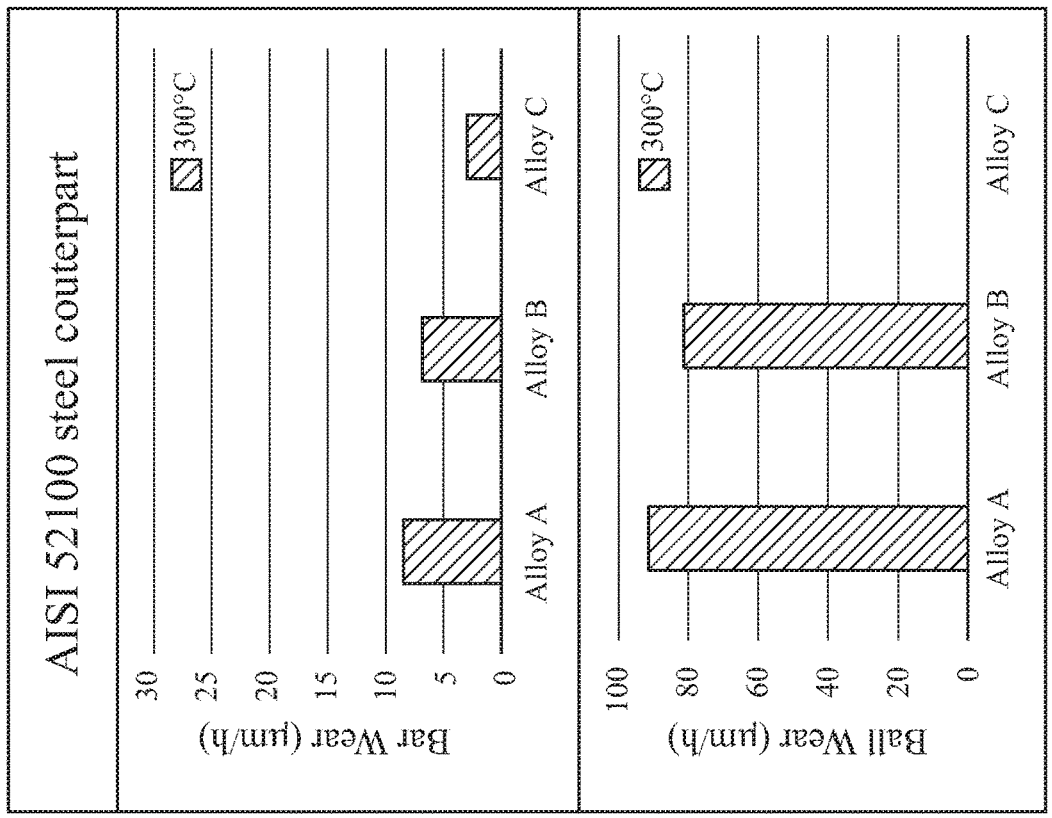

FIGS. 8A and 8B illustrate additional wear test results of the Alloys A and B compared to Alloy C against a steel counterpart. The nominal compositions of the powder metal materials are provided in FIG. 10. The lubricious oxide of Alloy C is generated regardless of the mating material. Against steel, there was no measurable steel wear, while the Alloy C has a very small amount of wear. For Alloys A & B, the amount of wear is significant, especially steel wear. Against a cobalt alloy, the amount of wear on the cobalt counterpart is negligible against Alloy C, but is significant against Alloys A & B.

Figure 9:
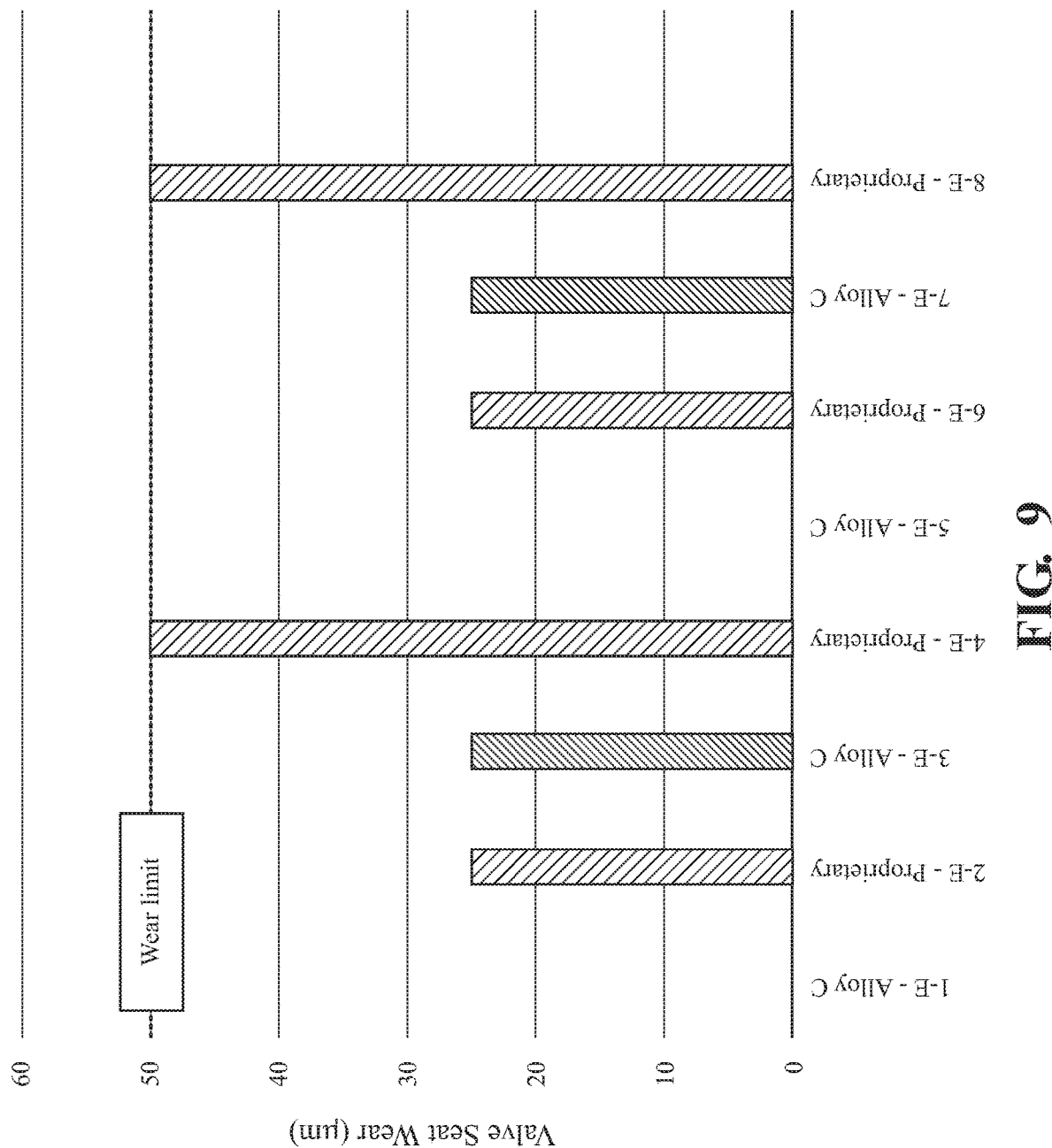
FIG. 9 is a graph illustrating the results of a dynamometer auto engine test on a valve seat formed of Alloy C.

FIG. 9 illustrates the results of a dynamometer auto engine test on a valve seat insert formed of Alloy C. This test is conducted on materials used for racing applications. During the test, the valve seat inserts ran against titanium coated valves. The test results show that Alloy C has a very low amount of wear after testing. Maximum wear on the example valve seat insert tested was about 25 µm, while the acceptance wear maximum limit is 50 µm.

When the material is used to form the valve seat insert, the high thermal conductivity can improve heat flow and transfer from the valve head into the water cooled engine head. This can aid engine designers by altering combustion dynamics, improving engine performance, reduce wear, and/or lower other component costs. The thermal conductivity of the material is higher than ferrous based material. Furthermore, the additives, hard particles, or tribological constituents in the base powder metal mixture improve performance, for example to gain wear resistance, thermal conductivity, or other advantages. In addition, when the Mo and/or W containing base powder metal mixture includes the sponge morphology, the sponge type structure allows for improved manufacturability and copper infiltration.

Many modifications and variations of the present invention are possible in light of the above teachings and may be practiced otherwise than as specifically described while within the scope of the claims. It is also contemplated that all features of all claims and of all embodiments can be combined with each other, so long as such combinations would not contradict one another.

The invention claimed is:

1. A valve seat insert, comprising:
a sintered material, said sintered material including a base powder metal mixture and a Cu-rich phase;
said base powder metal mixture including Mo, said Mo is present in an amount of 75.0 wt. % to 99.8 wt. %, based on the total weight of said base powder metal mixture;
said base powder metal mixture including at least one of B, N, and C present in an amount of 0.2 to 5.0 wt. %, based on the total weight of said base powder metal mixture;
said base powder metal mixture including a plurality of pores;
said Cu-rich phase disposed in said pores of said base powder metal mixture; and
said sintered material has a thermal conductivity of at least 70 W/mK.

2. The valve seat inset of claim 1, wherein said at least one of B, N, and C has a solubility in said base powder metal mixture of less than 0.1 wt. %, based on the total weight of said base powder metal mixture.

3. The valve seat insert of claim 1, wherein said base powder metal mixture includes at least one additional additive, said at least one additional additive includes at least one of silicon (Si), silver (Ag), cobalt (Co), chromium (Cr), iron (Fe), manganese (Mn), niobium (Nb), nickel (Ni), phosphorus (P), sulfur (S), tantalum (Ta), titanium (Ti), vanadium (V), and zirconium (Zr); and
said at least one of B, N, and C and said at least one additional additive together are present in a total amount of up to 25 wt. %, based on the total weight of said material.

4. The valve seat insert of claim 1, wherein said base powder metal mixture include a combination selected from the group consisting of: Mo, V, and N; Mo and C; Mo, W, and B; Mo and MoC; and Mo, V, and N.

5. The valve seat insert of claim 1, wherein said base powder metal mixture includes C and N.

6. The valve seat insert of claim 1, wherein said base powder mixture includes C, N and Si.

7. The valve seat insert of claim 1, wherein said Cu-rich phase is present in an amount of 15 wt. % to 50 wt. %, based on the total weight of said material.

8. The valve seat insert of claim 1, wherein said Cu-rich phase is pure copper, a copper alloy, or a copper-based material; and said Cu-rich phase has a thermal conductivity of at least 70 W/mK at 21° C.

9. The valve seat insert of claim 1, wherein said base powder metal mixture has a porosity of 10 volume percent (vol. %) to 50 vol. %, based on the total volume of said base powder metal mixture; and said Cu-rich phase fills the volume of said pores.

10. The valve seat insert of claim 1, wherein said material has a coefficient of friction of up to 0.8, and said material has a hardness greater than 55 HRA from 21° C. up to 500° C.

11. The valve seat insert of claim 1, wherein said base powder metal mixture includes at least one additional additive;
said at least one of B, N, and C is present in an amount of 0.2 to 5.0 wt. %, based on the total weight of said base powder metal mixture;
said at least one of B, N, and C has a solubility in said base powder metal mixture of less than 0.1 wt. %, based on the total weight of said base powder metal mixture;
said at least one additional additive includes at least one of silicon (Si), silver (Ag), cobalt (Co), chromium (Cr), iron (Fe), manganese (Mn), niobium (Nb), nickel (Ni), phosphorus (P), sulfur (S), tantalum (Ta), titanium (Ti), vanadium (V), and zirconium (Zr);
said at least one of B, N, and C and said at least one additional additive together are present in a total amount up to 25 wt. %, based on the total weight of said material;
said base powder metal mixture has a porosity of 10 volume percent (vol. %) to 50 vol. %, based on the total volume of said base powder metal mixture;
said base powder metal mixture is pressed;
said Cu-rich phase is pure copper, a copper alloy, or a copper-based material;
said Cu-rich phase has a thermal conductivity of at least 70 W/mK at 21° C.;
said Cu-rich phase fills the volume of said pores;
said Cu-rich phase is present in an amount of 15 wt. % to 50 wt. %, based on the total weight of said material;
said material has a coefficient of friction of up to 0.8; and
said material has a hardness greater than 55 HRA from 21° C. up to 500° C.;
and said material is sintered.

12. A material for use in an internal combustion engine, comprising:
a base powder metal mixture and a Cu-rich phase,
said base powder metal mixture including Mo, said Mo is present in an amount of 75.0 wt. % to 99.8 wt. %, based on the total weight of said base powder metal mixture;
said base powder metal mixture including at least one additive, said at least one additive including at least one of B, N, and C present in an amount of 0.2 to 5.0 wt. %, based on the total weight of said base powder metal mixture;
said base powder metal mixture including a plurality of pores; and
said Cu-rich phase disposed in said pores of said base powder metal mixture.

13. The material of claim 12, wherein said material is sintered and has a thermal conductivity of at least 70 W/mK, and said Cu-rich phase of said material has a thermal conductivity of at least 70 W/mK.

14. The material of claim 13, wherein said material has a thermal conductivity of at least 90 W/mK and said Cu-rich phase has a thermal conductivity of at least 90 W/mK.

15. The material of claim 14, wherein said material has a thermal conductivity of at least 100 W/mK and said Cu-rich phase has a thermal conductivity of at least 110 W/mK.

16. The material of claim 13, wherein said at least one of B, N, and C has a solubility in said base powder metal mixture of less than 0.1 wt. %, based on the total weight of said base powder metal mixture;
said at least one additive further includes at least one of silicon (Si), silver (Ag), cobalt (Co), chromium (Cr), iron (Fe), manganese (Mn), niobium (Nb), nickel (Ni), phosphorus (P), sulfur (S), tantalum (Ta), titanium (Ti), vanadium (V), and zirconium (Zr), in addition to said at least one of B, N, and C;
said additives are present in a total amount of up to 25 wt. %, based on the total weight of said material;

said base powder metal mixture has a porosity of 10 volume percent (vol. %) to 50 vol. %, based on the total volume of said base powder metal mixture;
said base powder metal mixture is pressed;
said Cu-rich phase is pure copper, a copper alloy, or a copper-based material;
said Cu-rich phase fills the volume of said pores;
said Cu-rich phase is present in an amount of 15 wt. % to 50 wt. %, based on the total weight of said material;
said material has a coefficient of friction of up to 0.8;
said material has a hardness greater than 55 HRA from 21° C. up to 500° C.

\* \* \* \* \*